(12) United States Patent
Yamamoto et al.

(10) Patent No.: US 8,691,434 B2
(45) Date of Patent: Apr. 8, 2014

(54) MAGNESIUM ION-CONTAINING NON-AQUEOUS ELECTROLYTE AND A PRODUCTION PROCESS THEREOF, AS WELL AS ELECTROCHEMICAL DEVICE

(75) Inventors: Kenta Yamamoto, Kanagawa (JP); Yuri Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1078 days.

(21) Appl. No.: 12/231,557

(22) Filed: Sep. 4, 2008

(65) Prior Publication Data

US 2009/0068568 A1 Mar. 12, 2009

(30) Foreign Application Priority Data

Sep. 7, 2007 (JP) ................. 2007-233134

(51) Int. Cl.
*H01M 10/05* (2010.01)
*H01M 10/056* (2010.01)
*H01M 10/054* (2010.01)

(52) U.S. Cl.
CPC .......... *H01M 10/056* (2013.01); *H01M 10/054* (2013.01)
USPC .......................................... 429/188; 429/324

(58) Field of Classification Search
CPC ........................... H01M 10/054; H01M 10/056
See application file for complete search history.

(56) References Cited

U.S. PATENT DOCUMENTS

| | | | |
|---|---|---|---|
| 5,538,811 A * | 7/1996 | Kanbara et al. | 429/307 |
| 6,426,164 B1 * | 7/2002 | Yamaura et al. | 429/231.6 |
| 6,713,212 B2 * | 3/2004 | Aurbach et al. | 429/188 |
| 2006/0068296 A1 * | 3/2006 | Nakagawa et al. | 429/324 |
| 2007/0172737 A1 | 7/2007 | Nakayama et al. | |
| 2009/0217979 A1 | 9/2009 | Yoneya et al. | |
| 2010/0136438 A1 | 6/2010 | Nakayama et al. | |
| 2010/0196762 A1 | 8/2010 | Yamamoto et al. | |
| 2011/0171536 A1 | 7/2011 | Oki et al. | |
| 2011/0277832 A1 | 11/2011 | Shimizu et al. | |

FOREIGN PATENT DOCUMENTS

| | | |
|---|---|---|
| JP | 2003-512704 A | 4/2003 |
| JP | 2004-259650 A | 9/2004 |

OTHER PUBLICATIONS

Aurbach, D. et al., "Prototype systems for rechargeable magnesium batteries", Nature, Oct. 12, 2000, vol. 407, pp. 724-727.
U.S. Appl. No. 10/589,043, filed Aug. 10, 2006, Nakayama et al.
U.S. Appl. No. 12/085,723, filed Mar. 3, 2010, Oki et al.

(Continued)

*Primary Examiner* — Ula C Ruddock
*Assistant Examiner* — Scott J Chmielecki
(74) *Attorney, Agent, or Firm* — Wolf, Greenfield & Sacks, P.C.

(57) ABSTRACT

A magnesium ion containing non-aqueous electrolyte in which magnesium ions and aluminum ions are dissolved in an organic etheric solvent, and which is formed by: adding metal magnesium, a halogenated hydrocarbon RX, an aluminum halide $AlY_3$, and a quaternary ammonium salt $R^1R^2R^3R^4N^+Z^-$ to an organic etheric solvent; and applying a heating treatment while stirring them (in the general formula RX representing the halogenated hydrocarbon, R is an alkyl group or an aryl group, X is chlorine, bromine, or iodine, in the general formula $AlY_3$ representing the aluminum halide, Y is chlorine, bromine, or iodine, in the general formula $R^1R^2R^3R^4N^+Z^-$ representing the quaternary ammonium salt, $R^1$, $R^2$, $R^3$, and $R^4$ represent each an alkyl group or an aryl group, and $Z^-$ represents chloride ion, bromide ion, iodide ion, acetate ion, perchlorate ion, tetrafluoro borate ion, hexafluoro phosphate ion, hexafluoro arsenate ion, perfluoroalkyl sulfonate ion, or perfluoroalkyl sulfonylimide ion.

18 Claims, 3 Drawing Sheets

(56) References Cited

OTHER PUBLICATIONS

U.S. Appl. No. 12/223,562, filed Jan. 8, 2009, Yoneya et al.
U.S. Appl. No. 12/452,503, filed Jan. 5, 2010, Nakayama et al.
U.S. Appl. No. 12/733,363, filed Feb. 25, 2010, Yamamoto et al.
U.S. Appl. No. 13/099,734, filed May 3, 2011, Shimizu et al.

* cited by examiner

MAGNESIUM ION-CONTAINING NON-AQUEOUS ELECTROLYTE AND A PRODUCTION PROCESS THEREOF, AS WELL AS ELECTROCHEMICAL DEVICE

CROSS REFERENCES TO RELATED APPLICATIONS

The present invention contains subject matter related to Japanese Patent Application JP 2007-233134 filed in the Japanese Patent Office on Sep. 7, 2007, the entire contents of which being incorporated herein by reference.

BACKGROUND OF THE INVENTION

1. Field of the Invention

The present invention relates to a magnesium ion containing non-aqueous electrolyte showing excellent electrochemical characteristics, a production process thereof, as well as an electrochemical device using the electrolyte.

2. Description of the Related Art

Materials suitable to a negative electrode active substance as one of basic constituent materials of a battery include those metals that tend to emit electrons to form cations, that is, metals of high ionization tendency. Metal lithium is an example thereof. A battery using metal lithium as a negative electrode active substance is constituted as a battery using a non-aqueous electrolyte, in combination with various positive electrode active substances such as oxides or sulfides into products and used as a power source mainly for small-sized portable electronic equipments.

In recent years, for improving the conveniency, decrease in the size, weight reduction, decrease in the thickness, and improvement in the performance for the small-sized portable electronic equipments have been proceeded year by year steadily and, accordingly, a battery used as a power source for the equipments described above have been demanded to be small in the size, light in the weight, reduced in the thickness and, particularly, have high capacity. Accordingly, it can be considered that the battery is better as the capacitance per unit mass (mAh/g) or capacitance per unit volume (mAh/cm$^3$) is higher for the negative electrode active substance and the positive electrode active substance constituting the battery.

When comparing the energy capacity per unit mass, the energy capacity of metal lithium (Li) is larger and more excellent compared with the energy capacity of other metals. Therefore, various studies have been reported so far on lithium secondary batteries. However, lithium secondary batteries involve a problem in view of the safety and, further, lithium is restricted in view of the resource and is expensive.

On the contrary, magnesium is abundant in view of the resource and less expensive compared with lithium. Further, metal magnesium has a large energy capacity per unit volume and has higher energy density compared with metal lithium. In addition, high safety can be expected in a case of use for batteries. As described above, the magnesium secondary battery is a secondary battery capable of compensating the drawbacks of the lithium secondary battery. In view of the above, an importance is attached at present to a development of a non-aqueous electrolyte battery using metal magnesium for the negative electrode active substance as the high capacity battery in the next generation. As in the examples described above, metal magnesium and magnesium ions are most promising materials as the electrolyte active substance respectively in electrochemical devices and charge carriers in electrolytes.

In the design for the electrochemical device using metal magnesium or magnesium ion, selection of the electrolyte is extremely important. For example, as the solvent for constituting the electrolyte, not only water and protonic organic solvent but also aprotonic organic solvents such as esters or acrylonitrile can not be used. This is because a passivation film not transmitting magnesium ions is formed on the surface of the metal magnesium when using them. The problem for the occurrence of the passivation film is one of bars for putting the magnesium secondary battery into practical use.

As the electrolyte free from the problem for the generation of the passivation film and capable of electrochemically utilizing magnesium, ether solutions of Grignard reagent (RMgX: R is alkyl group or aryl group, X is chlorine, bromine or iodine) have been known long since. When such electrolyte is used, metal magnesium can be precipitated and dissolved reversibly. However, it involves a problem that the oxidation potential of the electrolyte is as low as about +1.5 V relative to an equilibrium potential of metal magnesium and the potential window is insufficient for use as an electrochemical device (refer to description in Non-Patent Document 1 (A. Aurbach, Z. Lu, A. Schechter, Y. Gofer, H. Gizbar, R. Turgeman, Y. Cohen, M. Moshkovich, E. Levi "Prototype systems for rechargeable magnesium batteries". Nature, 407, p. 724-727 (2000) (pages 724 to 726, FIG. 3)).

On the contrary, in 2000, Aurbach, et al. in Bar-Iran University have found a tetrahydrofuran (THF) solution of Mg(ZR$_n$X$_{4-n}$)$_2$ capable of electrochemically utilizing magnesium (where Z is boron or aluminum, R is a hydrocarbon group, X is a halogen, and n=0 to 3) (refer to Patent Document 1 (JP-T No. 2003-512704 (pages 12 to 19, FIG. 3)) and Non-Patent Document 1). They not only conducted precipitation and dissolution of metal magnesium but also trially manufactured magnesium secondary batteries enabling charge/discharge at 2000 cycles or more.

On the other hand, Patent Document 2, JP-A No. 2004-259650 (pages 4 and 5, FIG. 1) reported that the problem of low oxidation potential of the electrolyte could be solved by using an etheric solution of an aromatic Grignard reagent RMgX (X is chlorine or bromine) in which R is an acryl group.

SUMMARY OF THE INVENTION

However, the electrolyte reported in Patent Document 1 uses instable starting materials and various solvents for the synthesis of electrolytes and preparation steps are extremely complicate. For example, since magnesium dichlorobutylethyl aluminate: Mg[AlCl$_2$(C$_2$H$_5$)(C$_4$H$_9$)]$_2$ used as an electrolyte salt is instable in atmospheric air, battery manufacturing steps have to be conducted in an inert atmosphere such as in an argon box. Accordingly, it is difficult to manufacture the battery in a dry room which is a general manufacturing circumstance for batteries using non-aqueous organic electrolytes. Accordingly, it may be considered practically impossible to make the magnesium battery reported in the Patent Document 1 into actual products as they are.

The present inventors have made a detailed additional test on a THF solution of phenyl magnesium bromide: C$_6$H$_5$MgBr at 1.0 mol/l concentration, which was described in the Patent Document 2 as having the oxidation potential at +3.8 V, and it was found that decomposition was started actually at about +2.0 V.

According to an embodiment of the present invention, there is provided a magnesium ion containing non-aqueous electrolyte capable of sufficiently taking advantage of excellent properties of metal magnesium as the negative electrode active substance, and capable of being produced in a usual production circumstance such as a dry room, a production process therefor, as well as an electrochemical device using the electrolyte.

For addressing the problems described above the present inventors have made studies detailed on the electrochemical characteristics and the stability in atmospheric air also including that during production steps for various magnesium ion containing non-aqueous electrolytes. As a result, the present invention has been accomplished.

That is, according to an embodiment of the present invention, a magnesium ion containing non-aqueous electrolyte in which magnesium ions and aluminum ions are dissolved in an organic etheric solvent, is formed by adding;

metal magnesium, a halogenated hydrocarbon RX, an aluminum halide $AlY_3$, and a quaternary ammonium salt $R^1R^2R^3R^4N^+Z^-$ to an organic etheric solvent and applying a heating treatment while stirring them (in the general formula RX that represents the halogenated hydrocarbon, R is an alkyl group or an aryl group, and X is chlorine, bromine, or iodine, in the general formula $AlY_3$ that represents the aluminum halide, Y is chlorine, bromine, or iodine, in the general formula $R^1R^2R^3R^4N^+Z^-$ that represents the quaternary ammonium salt, $R^1$, $R^2$, $R^3$, and $R^4$ represent each an alkyl group or an aryl group, and $Z^-$ represents a chloride ion ($Cl^-$), a bromide ion ($Br^-$), an iodide ion ($I^-$), an acetate ion ($CH_3COO^-$), a perchlorate ion ($ClO_4^-$), a tetrafluoro borate ion ($BF_4^-$), a hexafluoro phosphate ion ($PF_6^-$), a hexafluoro arsenate ion ($AsF_6^-$), a perfluoroalkyl sulfonate ion ($Rf1SO_3^-$) (Rf1 is a perfluoroalkyl group), or a perfluoroalkyl sulfonylimide ion ($Rf2SO_2)_2N^-$ (Rf2 is a perfluoroalkyl group).

Further, a process for producing a magnesium ion containing non-aqueous electrolyte according to an embodiment of the present invention includes the steps of;

adding metal magnesium, a halogenated hydrocarbon RX, an aluminum halide $AlY_3$, and a quaternary ammonium salt $R^1R^2R^3R^4N^+Z^-$ to an organic etheric solvent, and applying a heating treatment while stirring them thereby dissolving magnesium ions and aluminum ions into the organic etheric solvent.

(in the general formula RX that represents the halogenated hydrocarbon, R is an alkyl group or an aryl group, X is chlorine, bromine, or iodine. Further, in the general formula $AlY_3$ that represents the aluminum halide, Y is chlorine, bromine, or iodine. Further, in the general formula $R^1R^2R^3R^4N^+Z^-$ that represents the quaternary ammonium salt, $R^1$, $R^2$, $R^3$, and $R^4$ represent each an alkyl group or an aryl group, and $Z^-$ represents a chloride ion ($Cl^-$), a bromide ion ($Br^-$), an iodide ion ($I^-$), an acetate ion ($CH_3COO^-$), a perchlorate ion ($ClO_4^-$), a tetrafluoro borate ion ($BF_4^-$), a hexafluoro phosphate ion ($PF_6^-$), a hexafluoro arsenate ion ($AsF_6^-$), a perfluoroalkyl sulfonate ion ($Rf1SO_3^-$ (Rf1 is perfluoroalkyl group), or a perfluoroalkyl sulfonylimide ion ($Rf2SO_2)_2N^-$ (Rf2 is a perfluoroalkyl group).

Further, an electrochemical device according to an embodiment of the present invention has a first electrode, a second electrode, and the magnesium ion containing non-aqueous electrolytes, in which an active substance of the second electrode is constituted so as to be oxidized to form magnesium ions.

The organic etheric solvent means a pure solvent containing at least one organic etheric compound, or a mixed solvent thereof.

The magnesium ion containing non-aqueous electrolyte according to an embodiment of the present invention is an electrolyte in which magnesium ions and aluminum ions are dissolved in an organic etheric solvent, and which is formed by:

adding metal magnesium, a halogenated hydrocarbon RX, an aluminum halide $AlY_3$ and a quaternary ammonium salt $R^1R^2R^3R^4N^+Z^-$ to the etheric solvent and applying a heating treatment to them.

As a result of an earnest study of the present inventors, it has been found that magnesium can be dissolved and precipitated reversibly by using the electrolyte having the specific constitution. In addition, since the magnesium ion containing non-aqueous electrolyte has high conductivity, high oxidation potential and large potential window, it is suitable as an electrolyte for an electrochemical device.

It is considered that when metal magnesium and the halogenated hydrocarbon RX are reacted in the organic etheric solvent, a Grignard reagent is usually formed. However, since the magnesium ion containing non-aqueous electrolyte according to the embodiment of the present invention has a higher oxidation potential compared with a Grignard reagent, it is considered that the Grignard reagent formed by the reaction between metal magnesium and the halogenated hydrocarbon RX is changed to a more stable compound by the reaction with the aluminum halide and/or quaternary ammonium salt.

Further, the process for producing the magnesium ion containing non-aqueous electrolyte according to an embodiment of the present invention is inextricably linked to the magnesium ion containing non-aqueous electrolyte according to the embodiment of the present invention. According to the production process, since the solvent for the electrolyte itself is used for the synthesis, this is simple and convenient compared with existent processes. Further, since metal magnesium, magnesium salts and other stable materials are used as the starting materials, administration for the starting materials is easy and production can be conducted by simple reaction, at good productivity and reliably by using a usual equipment such as a dry room. That is, it has a possibility capable of producing the magnesium ion containing non-aqueous electrolyte according to the embodiment of the present invention in good yield and capable of greatly saving the production cost. Further, an optimal material can be selected from wide variety of materials, the oxidation potential of the magnesium ion containing non-aqueous electrolyte can be kept as high as possible.

Further, since the electrochemical device according to an embodiment of the present invention uses the magnesium ion containing non-aqueous electrolyte as the electrolyte, this can take advantage of excellent characteristics of metal magnesium as the negative electrode active substance sufficiently.

For example, in a case of constituting the electrochemical device as a magnesium battery, since the magnesium ion containing non-aqueous electrolyte has a high oxidation potential and, accordingly, the electrolyte is not oxidatively decomposed by a high electromotive force generated between the first electrode and the second electrode, a battery of high output voltage can be attained while taking advantageous feature of magnesium as a metal of high ionization tendency. Further, in a case of charging and re-using the battery after discharge as a secondary battery, since the oxidation potential of the electrolyte is high and, accordingly, the battery can be charged to a sufficient charged state by a high charging voltage, a large energy capacity of the magnesium battery can be utilized sufficiently.

In the magnesium ion containing non-aqueous electrolyte and the production process therefor according to the embodiments of the present invention, the halogenated hydrocarbon is preferably at least one element selected from the group consisting of iodomethane, iodoethane, 1-iodopropane, 2-iodopropane, 1-iodobutane, 2-iodobutane, bromoethane, 1-bromopropane, 2-bromopropane, 1-bromobutane, 2-bromobutane, bromobenzene, o-dibromobenzene, m-dibromobenzene, p-dibromobenzene, 1-chloropropane, 2-chloropropane, chlorobenzene, o-dichlorobenzene, m-dichlorobenzene, and p-dichlorobenzene. It has been found that the magnesium ion containing non-aqueous electrolyte according to the embodiment of the present invention shows substantially identical performance for the discharging capacity in any of the cases described above when produced by using any of the halogenated hydrocarbons described above.

The halogenated hydrocarbon is preferably added at a ratio from 0.8 to 1.2 mol based on 1 mol of the metal magnesium. This is considered to be attributable to that the stoichiometrical ratio of the halogenated hydrocarbon to the metal magnesium is 1 in the reaction where the Grignard reagent is prepared from the metal magnesium and the halogenated hydrocarbon.

Further, the aluminum halide is preferably aluminum chloride. Further, the aluminum halide is preferably added at a ratio from 1.0 to 2.0 mol based on 1 mol of the metal magnesium.

Further, the quaternary ammonium salt is preferably tetrabutyl ammonium trifluoromethane sulfonate ($CF_3SO_3N(C_4H_9)_4$). Further, the quaternary ammonium salt is preferably added at a ratio of 1.0 to 2.0 mol based on 1 mol of the metal magnesium.

Preferably, the organic etheric solvent is, for example, 1,2-dimethoxyethane. The organic etheric compounds does not form a passivation film upon dissolution and precipitation of magnesium by the electrode reaction and can form a coordination bond with the magnesium ions to dissolve the magnesium ions therein. Heretofore, tetrahydrofuran (THF) has been often used as the organic etheric compound constituting the electrolyte of the magnesium battery including the example of the Non-Patent Document 1. However, the boiling point of THF is 66° C. and, in a case of assuming the actual working condition of the battery in a high temperature circumstance, the battery temperature may be higher than the boiling point of THF and the vapor pressure of the THF may possibly exceed the atmospheric pressure in the worst case. On the other hand, the boiling point of 1,2-dimethoxyethane is 84° C. which is higher by about 20° C. than the boiling point of THF. Therefore, a possibility that the battery temperature is higher than the boiling point is decreased remarkably compared with THF to improve the battery safety in the high temperature circumstance.

Further, the metal magnesium is added to the organic etheric solvent, preferably, at a ratio from 0.25 to 1.0 mol/l.

Further, the heating temperature in the heating treatment is preferably from 50 to 80° C.

In the electrochemical device according to the embodiment of the present invention, the active substance of the second electrode is preferably elemental metal of magnesium or an alloy containing magnesium. For increasing the energy capacity, a pure metal is desirably used for the negative electrode. On the other hand, the alloy may also be used preferably for improving other battery performance than the energy capacity such as stabilization of the second electrode against repetitive charge/discharge.

The active substance of the first electrode preferably comprises a compound reactive with the magnesium ions or a compound occluding the magnesium ions.

Further, the electrochemical device is preferably constituted as a battery. The battery may be a primary battery discarded after use for once but is preferably adapted as a chargeable secondary battery. Since the secondary battery after use can be returned to the state before discharge by supplying a current in a direction opposite to that of discharge, it can be used repetitively and the resource can be utilized effectively.

DESCRIPTION OF THE ACCOMPANYING DRAWINGS

Embodiments of the present invention will be described in detail based on the following figures, wherein.

Figure 5:
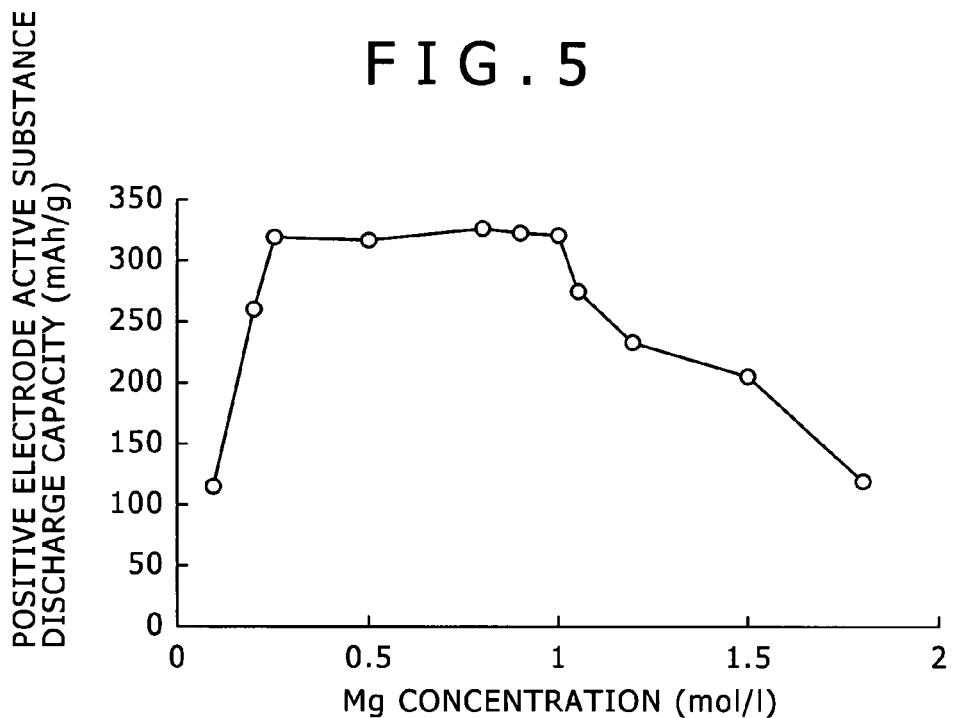
Figure 6:
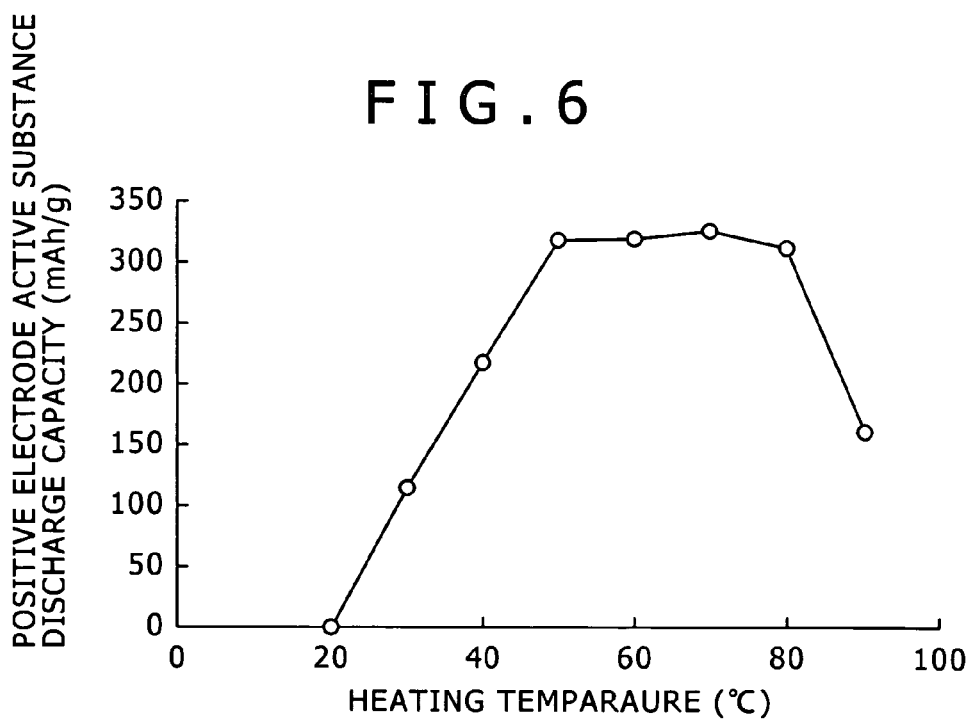

FIG. 5 is a graph showing a relation between the concentration of magnesium used for the synthesis of an electrolyte according to Example 5 of the present invention and a discharge capacity of a magnesium battery manufactured by using the electrolyte; and FIG. 6 is a graph showing a relation between the temperature upon synthesis of an electrolyte according to Example 6 of the present invention and a discharge capacity of a magnesium battery manufactured by using the electrolyte.

DETAILED DESCRIPTION OF PREFERRED EMBODIMENTS

Preferred embodiments of the present invention will be described specifically with reference to the drawings. In this embodiment, a magnesium battery and an electrolyte therefor are to be described as examples of the magnesium ion containing non-aqueous electrolyte according to the embodiment of the present invention and an electrochemical device using the electrolyte according to the embodiment of the present invention. By the way, the description is to be made herein merely as an example and it should be understood that the present invention is not restricted thereto.

Figure 1:
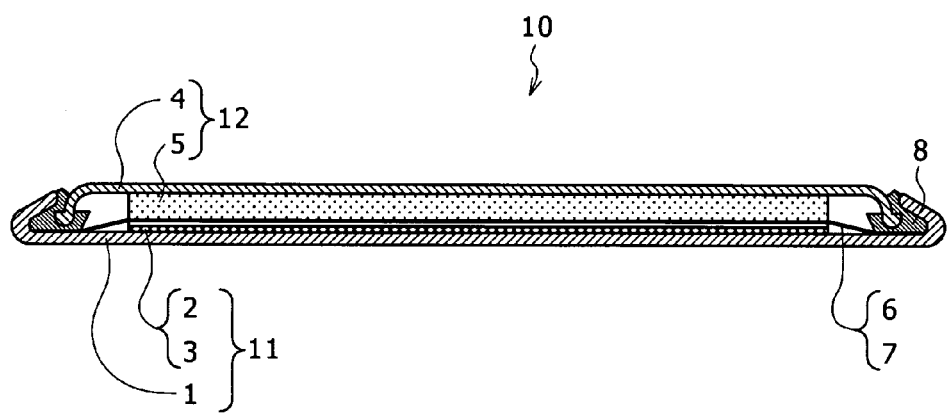
FIG. 1 is a cross sectional view showing the constitution of a magnesium battery according to a preferred embodiment of the present invention.

FIG. 1 is a cross sectional view showing the structure of a magnesium battery 10 according to this embodiment. As shown in FIG. 1, the magnesium battery 10 is formed as a coin-shaped battery having a thin disk-like outer shape. A positive electrode 11 as the first electrode comprises a positive electrode casing 1, a positive electrode pellet 2, and a metal net support 3, while a negative electrode 12 as the second electrode comprises a negative electrode cup 4 and a negative electrode active substance 5. The positive electrode pellet 2 and the negative electrode active substance 5 are disposed such that they are in contact with a separator 6 respectively and can be prevented from short circuit between each other by the separator 6, and an electrolyte 7 is injected into the separator 6.

The positive electrode casing 1 functions as a collector and an outer positive electrode terminal of the battery. The positive electrode pellet 2 is formed from a positive electrode mix comprising a positive electrode active substance, a conductor agent, and a binder being press-molded together with the metal net support 3 into a disk-shape and disposed in the inside of the positive electrode casing 1. The metal net support 3 functions as a positive electrode pellet support and a collector.

The positive electrode active substance comprises, for example, fluoro graphite $((CF)_n)$, or an oxide or halide of metal element such as scandium (Sc), titanium (Ti), vanadium (V), chromium (Cr), manganese (Mn), iron (Fe), cobalt (Co), nickel (Ni), copper (Cu), and zinc (Zn).

The negative electrode cup 4 functions as a collector and an outer negative electrode terminal of the battery. The negative electrode active substance 5 is, for example, a metal magnesium plate molded into a disk-like shape and disposed so as to be in contact with the negative electrode cup 4. For increasing the energy capacity of the negative electrode 12 as high as possible, it is desirable to use pure metal magnesium for the negative electrode active substance 5. However, an alloy can also be used as a material for the negative electrode active substance 5 for improving other battery performances than the energy capacity such as stabilization of the negative electrode active substance 5 against repetitive charge/discharge.

For the separator 6, a polyolefinic porous film, for example, of polypropylene or polyethylene can be used. The positive electrode casing 1 and the negative electrode cup 4 are fitted by way of a sealing gasket 8. The sealing gasket 8 has a function of sealing the inside of the magnesium battery 10 while electrically insulating the positive electrode 1 and the negative electrode 2.

The electrolyte 7 is a magnesium ion containing non-aqueous electrolyte according to the embodiment of the present invention. The electrolyte is produced, for example, by using 1,2-dimethoxyethane as the organic etheric solvent, and adding metal magnesium at a ratio of from 0.25 to 1.00 mol/l to the solvent. Then, iodomethane $CH_3I$ is used as the halogenated hydrocarbon RX and added at a ratio of from 0.8 to 1.2 mol based on 1 mol magnesium, aluminum chloride $AlCl_3$ is used as the aluminum halide $AlY_3$ and added at a ratio of from 1.0 to 2.0 mol based on 1 mol of magnesium, and tetrabutyl ammonium trifluoromethane sulfonate $(CF_3SO_3N(C_4H_9)_4$ is used as the quaternary ammonium salt $R^1R^2R^3R^4N^+Z^-$ and added at a ratio of 1.0 to 2.0 mol based on 1 mol of magnesium.

By subjecting them to a heating treatment at 50 to 80° C. while stirring, magnesium ions and aluminum ions are dissolved in 1,2-dimethoxyethane as the organic etheric solvent.

In this case, it is considered that a reaction of forming a Grignard compound RMgX is taken place between the metal magnesium and the halogenated hydrocarbon RX as below:

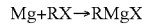

In the example described above in which the halogenated hydrocarbon is iodomethane, it is considered that the following reaction is taken place:

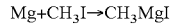

It is considered that the hydrocarbon group R (methyl group $CH_3$ in the example described above) is then transferred to the aluminum ion in which an instable Grignard compound RMgX is eliminated and, instead, a stable aluminum complex is generated to form an electrolyte of a large potential window.

During discharge, metal magnesium or an alloy thereof as the negative electrode active substance 5 is oxidized on the negative electrode 12 of the magnesium battery 10, in accordance with the following reaction formula:

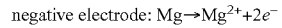

and electrons are emitted through the negative electrode cup 4 to an external circuit. The magnesium ions formed by the reaction are leached into the electrolyte 7, and diffused in the electrolyte 7, and move to the positive electrode 11.

The magnesium ions moved to the positive electrode 11 are trapped on the surface of the oxide or halide as the positive electrode active substance and on the inner wall surface of voids formed in the oxide or the halogenide and reacted with the positive electrode substance. Simultaneously, the element constituting the positive electrode reactive substance is reduced and electrons are taken in from an external circuit, for example, by way of the positive electrode casing 1.

EXAMPLE

Examples of the present invention are to be described.

Example 1

In Example 1, the coin shaped magnesium battery 10 explained with reference to FIG. 1 in the preferred embodiment was manufactured by using metal magnesium as a negative electrode active substance, manganese oxide as a positive electrode active substance and the electrolyte according to the embodiment of the present invention as the electrolyte, and the performance of the electrolyte according to the embodiment of the present invention was investigated.

<Synthesis of Magnesium Ion-Containing Non-Aqueous Electrolyte 7>

Metal magnesium Mg was added to 1,2-dimethoxyethane: $CH_3OCH_2CH_2OCH_3$ and they were reacted. Further, iodomethane: $CH_3I$, aluminum chloride: $AlCl_3$, and tetrabutyl ammonium trifluoromethane sulfonate: $CF_3SO_3N(C_4H_9)_4$ were added to prepare a mixture formed by adding Mg at a ratio of 0.50 mol/l, $CH_3I$ at a ratio of 0.50 mol/l, $AlCl_3$ at a ratio of 0.50 mol/l, and $CF_3SO_3N(C_4H_9)_4$ at a ratio of 0.50 mol/l to 1,2-dimethoxyethane.

By applying a heating treatment at 60° C. while stirring them, a non-aqueous electrolyte 7 in which magnesium ions and aluminum ions were dissolved in 1,2-dimethoxyethane was synthesized.

<Formation of Positive Electrode Pellet 2 and Negative Electrode Active Substance 5>

At first, 2 g of potassium permanganese was added to 50 ml of hydrochloric acid at a concentration of 4 mol/l and stirred at a room temperature for 15 min. After standing still, formed precipitates were separated by filtration, washed with water sufficiently and then applied with a heating treatment at 300° C. for 2 hours to synthesize a manganese oxide.

Then, the manganese oxide, graphite as a conductive material, and polyvinylidene fluoride (PVdF) as a binder were mixed at a 78:20:2 mass ratio. N-methyl pyrrolidone (NMP) was added as a solvent to the mixture and polyvinylidene fluoride as a binder was dissolved, and the manganese oxide and the graphite were dispersed in the resultant solution to form a positive electrode mix slurry. The obtained slurry was subjected to a heating treatment at a temperature of 120° C. for 2 hours and NMP was evaporated from the slurry, followed by solidification. The solidified product was pulverized into a powdery form in a mortal to obtain a positive electrode mix.

The positive electrode mix was weighed by 0.1 g, press bonded to a metal net support 3 made of nickel under a predetermined pressure and press-molded into a disk-like shape to form a positive electrode pellet 2 of 15.5 mm diameter and 250 μm thickness.

On the other hand, a magnesium plate was fabricated and molded into a disk-shape of 15.5 mm diameter and 800 μm thickness to form a negative electrode active substance 5.

<Manufacture of Magnesium Battery 10>

A magnesium battery 10 was assembled in a dry room. At first, a positive electrode pellet 2 was disposed to the inside of a positive electrode casing 1 and, after disposing thereon a separator 6 formed of a porous film made of polyethylene of 25 μm thickness, a predetermined amount of an electrolyte 7 was injected to the separator 6. Then, a magnesium plate as the negative electrode active substance 5 was stacked on the separator 6 and, further, a sealing gasket 8 and a negative electrode cup 4 were disposed at predetermined positions. Finally, the positive electrode casing 1 and the negative electrode cup 4 were fitted by way of the sealing gasket 8 to manufacture a coin-shaped magnesium battery 10 of 20 mm outer diameter and 1.6 mm height.

<Discharge Test>

For the magnesium battery 10 of Example 1 manufactured as described above, a discharge test was conducted at a constant current of 0.5 mA till the battery voltage was lowered to 0.2 V. Table 1 shows the obtained discharge capacity. Since metal magnesium as the negative electrode active substance 5 was disposed in an excess amount, it can be regarded that the discharge capacity determined here is decided by the discharge capacity of the positive electrode active substance and the performance of the electrolyte.

Comparative Example 1

In Comparative Example 1, $CF_3SO_3N(C_4H_9)_4$ as the quaternary ammonium salt was not added upon synthesis of the electrolyte 7. Except for the foregoings, a magnesium battery having the same structure as in the magnesium battery 10 was manufactured in the same manner as in Example 1 and a charge test was conducted on the magnesium battery but no effective discharge capacity could be obtained.

Comparative Example 2

In Comparative Example 2, $AlCl_3$ as the aluminum halide was not added upon synthesis of the electrolyte 7. In this case, while $CF_3SO_3N(C_4H_9)_4$ was added to the electrolyte 7 in the same manner as in Example 1 in Comparative Example 2-1, whereas this was not added in Comparative Example 2-2. Excepting for the foregoings, magnesium batteries having the same structure as in the magnesium battery 10 were manufactured in the same manner as in Example 1. While the discharge test was conducted in the same manner as in Example 1 on the magnesium batteries described above, no effective discharge capacity could be obtained both in Comparative Examples 2-1 and 2-2.

Comparative Example 3

In Comparative Example 3, magnesium dichlorobutylethyl aluminate: $Mg[AlCl_2(C_2H_5)(C_4H_9)]_2$ in THF solution (concentration: 0.25 mol/l) described as the electrolyte for the magnesium battery in Non-Patent Document 1 was used as the electrolyte instead of the electrolyte according to the embodiment of the present invention. Except for the foregoings, magnesium batteries having the same structure as in the magnesium battery 10 were manufactured in the same manner as in Example 1. In this case, the magnesium battery in Comparative Example 3-1 was assembled in a dry room in the same manner as in Example 1. On the other hand, the magnesium battery in Comparative Example 3-2 was assembled in an inert gas atmosphere in an argon glove box. While the discharge test was conducted in the same manner as in Example 1 on the magnesium batteries described above, no effective discharge capacity was obtained in Comparative Example 3-1. Table 1 shows the discharge capacity obtained in the battery of Comparative Example 3-2. In Table 1, the quaternary salt concentration means the concentration of the quaternary ammonium salt: $CF_3SO_3N(C_4H_9)_4$.

TABLE 1

| Battery | Mg concentration (mol/l) | $CH_3I$ concentration (mol/l) | $AlCl_3$ concentration (mol/l) | Quaternary salt concentration (mol/l) | Heating temperature (° C.) | Discharge capacity (mAh/g) |
|---|---|---|---|---|---|---|
| Example 1 | 0.50 | 0.50 | 0.50 | 0.50 | 60 | 298.9 |
| Comparative Example 1 | 0.50 | 0.50 | 0.50 | 0.00 | | 0.0 |
| Comparative Example 2-1 | 0.50 | 0.50 | 0.00 | 0.50 | | 0.0 |
| Comparative Example 2-2 | 0.50 | 0.50 | 0.00 | 0.00 | | 0.0 |
| Comparative Example 3-1 | THF solution of 0.25 mol/l $Mg[AlCl_2(C_2H_5)(C_4H_9)]_2$ | | | | | 0.0 |
| Comparative Example 3-2 | THF solution of 0.25 mol/l $Mg[AlCl_2(C_2H_5)(C_4H_9)]_2$ | | | | | 314.0 |

Since the effective discharge capacity could not be obtained in the battery of Comparative Example 1 and the battery of Comparative Example 2, it can be seen that the quaternary ammonium salt and the aluminum halide are essential ingredients in the electrolyte according to the embodiment of the present invention. Further, since effective discharge capacity could not be obtained in the battery of Comparative Example 3-1, it can be seen that a facility capable of assembling the magnesium battery in an inert gas atmosphere such as an argon glove box is necessary for using magnesium dichlorobutylethyl aluminate described in the Non-Patent Document 1.

On the other hand, the battery of Example 1 and the battery of Comparative Example 3-2 showed substantially identical discharge capacity. From the result of Example 5 to be described later, it is considered that the discharge capacity of them is mainly determined by the discharge capacity of the positive electrode active substance and the electrolyte provides the function thereof with no troubles. Accordingly, in the batteries of the following examples, when the discharge capacity substantially equal with that of the battery of Example 1 or the battery of Comparative Example 3-2 can be obtained, the electrolyte of the battery was judged as satisfactory.

Then, in Examples 2 to 6, good synthesis conditions for the electrolyte according to the embodiment of the present invention as the electrolyte of the magnesium battery were investigated.

Example 2

In Example 2, the concentration of aluminum chloride: $AlCl_3$ was changed in a range from 0.25 to 1.50 mol/l. Except for the foregoings, magnesium batteries 10 using the electrolyte according to the embodiment of the present invention were manufactured and a discharge test was conducted on them in the same manner as in Example 1. Table 2 shows the obtained discharge capacity.

TABLE 2

| Battery | Mg concentration (mol/l) | $CH_3I$ concentration (mol/l) | $AlCl_3$ concentration (mol/l) | Quaternary salt concentration (mol/l) | Heating temperature (° C.) | Discharge capacity (mAh/g) |
|---|---|---|---|---|---|---|
| Example 2-1 | 0.50 | 0.50 | 0.25 | 0.50 | 60 | 136.5 |
| Example 2-2 | | | 0.40 | | | 192.3 |
| Example 1 | | | 0.50 | | | 298.9 |
| Example 2-3 | | | 0.75 | | | 305.0 |
| Example 2-4 | | | 0.90 | | | 311.8 |
| Example 2-5 | | | 1.00 | | | 317.9 |
| Example 2-6 | | | 1.10 | | | 271.0 |
| Example 2-7 | | | 1.25 | | | 219.9 |
| Example 2-8 | | | 1.50 | | | 155.7 |

Figure 2:
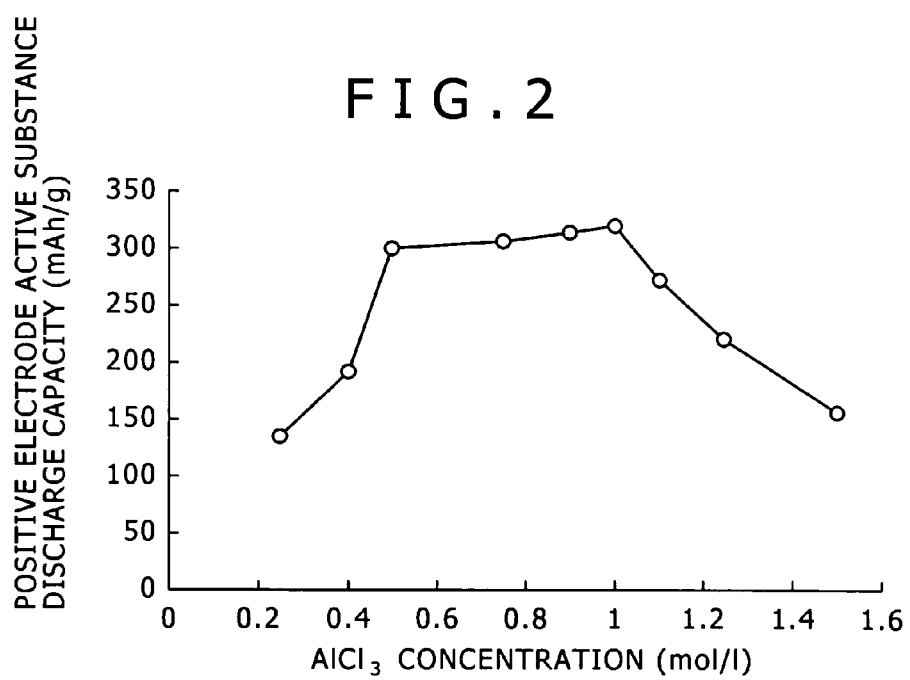
FIG. 2 is a graph showing a relation between the concentration of aluminum chloride used for the synthesis of an electrolyte according to Example 2 of the present invention and a discharge capacity of a magnesium battery manufactured by using the electrolyte.

FIG. 2 is a graph showing a relation between the concentration of $AlCl_3$ used for the synthesis of the electrolyte and the discharge capacity of the magnesium battery in Example 2. As can be seen from Table 2 and FIG. 2, the electrolyte synthesized in Example 2 is satisfactory as the electrolyte for the magnesium battery 10 in a case where the concentration of $AlCl_3$ is from 0.50 to 1.00 mol/l (addition amount of $AlCl_3$ is from 1.0 to 2.0 mol based on 1 mol of Mg).

Example 3

In Example 3, the concentration of methane iodide: $CH_3I$ was changed in a range from 0 to 1.00 mol/l. Except for the foregoings, magnesium batteries 10 using the electrolyte according to the embodiment of the present invention were manufactured and a discharge test was conducted on them in the same manner as in Example 1. Table 3 shows the obtained discharge capacity.

TABLE 3

| Battery | Mg concentration (mol/l) | $CH_3I$ concentration (mol/l) | $AlCl_3$ concentration (mol/l) | Quaternary salt concentration (mol/l) | Heating temperature (° C.) | Discharge capacity (mAh/g) |
|---|---|---|---|---|---|---|
| Example 3-1 | 0.50 | 0.00 | 1.00 | 0.50 | 60 | 0.0 |
| Example 3-2 | | 0.25 | | | | 194.5 |
| Example 3-3 | | 0.40 | | | | 312.4 |
| Example 2-5 | | 0.50 | | | | 317.9 |
| Example 3-4 | | 0.60 | | | | 305.9 |
| Example 3-5 | | 0.75 | | | | 244.3 |
| Example 3-6 | | 1.00 | | | | 154.0 |

Figure 3:
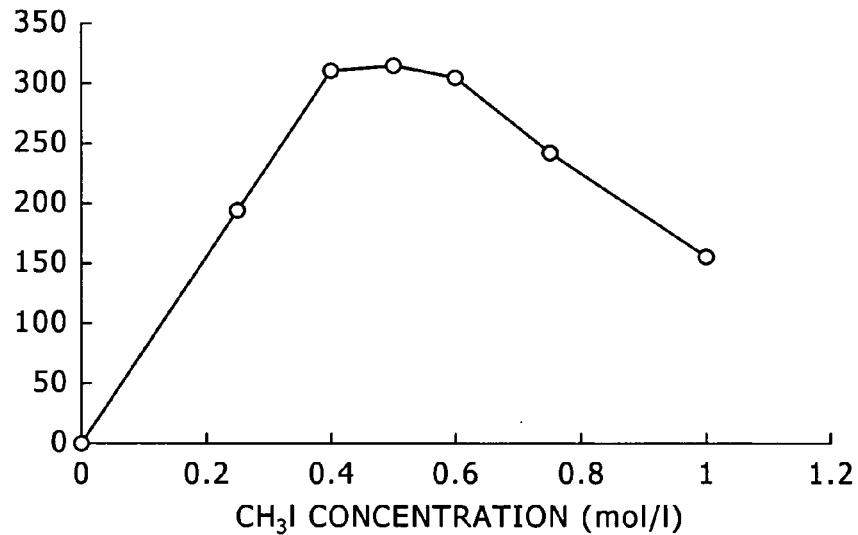
FIG. 3 is a graph showing a relation between the concentration of iodomethane used for the synthesis of an electrolyte according to Example 3 of the present invention and a discharge capacity of a magnesium battery manufactured by using the electrolyte.

FIG. 3 is a graph showing a relation between the concentration of $CH_3I$ used for the synthesis of the electrolyte and the discharge capacity of the magnesium battery in Example 3. As can be seen from Table 3 and FIG. 3, the electrolyte synthesized in Example 3 is satisfactory as the electrolyte for the magnesium battery 10 in a case where the concentration of $CH_3I$ is from 0.40 to 0.60 mol/l (addition amount of $CH_3I$ is from 0.80 to 1.20 mol based on 1 mol of Mg).

Example 4

In Example 4, the concentration of quaternary ammonium salt: $CF_3SO_3N(C_4H_9)_4$ was changed in a range from 0.10 to 1.50 mol/l. Except for the foregoings, magnesium batteries 10 using the electrolyte according to the embodiment of the present invention was manufactured and a discharge test was conducted on them in the same manner as in Example 1. Table 4 shows the obtained discharge capacity.

TABLE 4

| Battery | Mg concentration (mol/l) | $CH_3I$ concentration (mol/l) | $AlCl_3$ concentration (mol/l) | Quaternary salt concentration (mol/l) | Heating temperature (° C.) | Discharge capacity (mAh/g) |
| --- | --- | --- | --- | --- | --- | --- |
| Example 4-1 | 0.50 | 0.50 | 1.00 | 0.10 | 60 | 62.8 |
| Example 4-2 | | | | 0.25 | | 116.2 |
| Example 4-3 | | | | 0.40 | | 184.3 |
| Example 2-5 | | | | 0.50 | | 317.9 |
| Example 4-4 | | | | 0.75 | | 314.6 |
| Example 4-5 | | | | 1.00 | | 317.7 |
| Example 4-6 | | | | 1.10 | | 262.0 |
| Example 4-7 | | | | 1.25 | | 210.1 |
| Example 4-8 | | | | 1.50 | | 165.8 |

Figure 4:
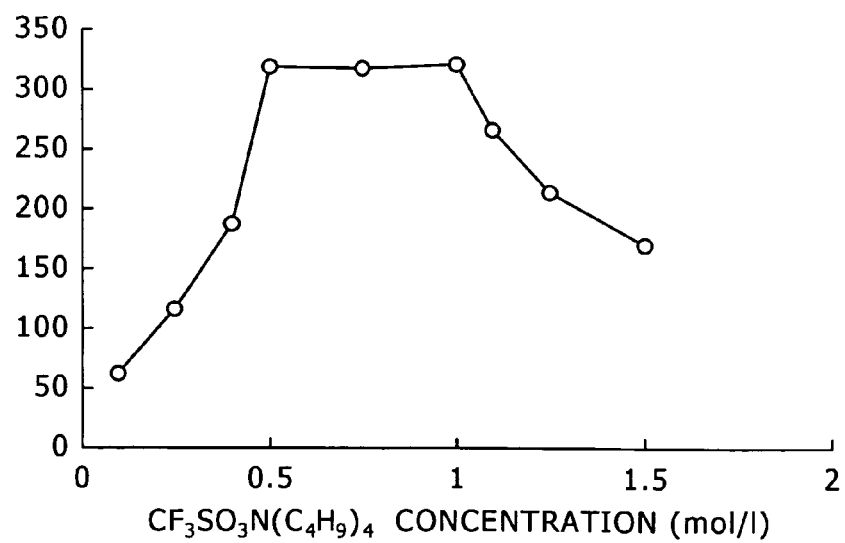
FIG. 4 is a graph showing a relation between the concentration of a quaternary ammonium salt used for the synthesis of an electrolyte according to Example 4 of the present invention and a discharge capacity of a magnesium battery manufactured by using the electrolyte.

FIG. 4 is a graph showing a relation between the concentration of the salt used for the synthesis of the electrolyte and the discharge capacity of the magnesium battery in Example 4. As can be seen from Table 4 and FIG. 4, the electrolyte synthesized in Example 4 is satisfactory as the electrolyte for the magnesium battery 10 in a case where the concentration of the salt is from 0.50 to 1.00 mol/l (the addition amount of the salt is from 1.0 to 2.0 mol based on 1 mol of Mg).

Example 5

In Example 5, the concentration of the magnesium compound was changed in a range from 0.10 to 1.80 mol/l. In this case, the concentration of $CH_3I$ was made equal with the concentration of Mg and the concentration for $AlCl_3$ and $CF_3SO_3N(C_4H_9)_4$ was made twice the concentration of Mg. Except for the foregoings, magnesium batteries 10 using the electrolyte according to the embodiment of the present invention were manufactured and a discharge test was conducted on them in the same manner as in Example 1. Table 5 shows the obtained discharge capacity.

TABLE 5

| Battery | Mg concentration (mol/l) | $CH_3I$ concentration (mol/l) | $AlCl_3$ concentration (mol/l) | Quaternary salt concentration (mol/l) | Heating temperature (° C.) | Discharge capacity (mAh/g) |
| --- | --- | --- | --- | --- | --- | --- |
| Example 5-1 | 0.10 | 0.10 | 0.20 | 0.20 | 60 | 115.9 |
| Example 5-2 | 0.20 | 0.20 | 0.40 | 0.40 | | 261.3 |
| Example 5-3 | 0.25 | 0.25 | 0.50 | 0.50 | | 318.9 |
| Example 4-5 | 0.50 | 0.50 | 1.00 | 1.00 | | 317.7 |
| Example 5-4 | 0.80 | 0.80 | 1.60 | 1.60 | | 325.8 |
| Example 5-5 | 0.90 | 0.90 | 1.80 | 1.80 | | 321.9 |
| Example 5-6 | 1.00 | 1.00 | 2.00 | 2.00 | | 320.1 |
| Example 5-7 | 1.05 | 1.05 | 2.10 | 2.10 | | 275.0 |
| Example 5-8 | 1.20 | 1.20 | 2.40 | 2.40 | | 234.7 |

TABLE 5-continued

| Battery | Mg concentration (mol/l) | CH$_3$I concentration (mol/l) | AlCl$_3$ concentration (mol/l) | Quaternary salt concentration (mol/l) | Heating temperature (° C.) | Discharge capacity (mAh/g) |
|---|---|---|---|---|---|---|
| Example 5-9 | 1.50 | 1.50 | 3.00 | 3.00 | | 205.2 |
| Example 5-10 | 1.80 | 1.80 | 3.60 | 3.60 | | 118.4 |

FIG. 5 is a graph showing a relation between the concentration of Mg used for synthesis of the electrolyte and the discharge capacity of the magnesium battery in Example 5. It can be seen from Table 5 and FIG. 5 that the discharge capacity increased substantially in proportion to the concentration of Mg in a region where the concentration of Mg is from 0 to 0.25 mol/l and, then, the discharge capacity was settled to a substantially constant value at about 320 (mAh/g) in a region of 0.25 to 1.00 mol/l. This is considered that when the Mg concentration is from 0 to 0.25 mol/l, the discharge capacity of the magnesium battery is restricted by the Mg concentration of the electrolyte and the Mg concentration of the electrolyte is insufficient. On the other hand, it is considered that when the Mg concentration is from 0.25 to 1.00 mol/l, since the Mg concentration of the electrolyte is sufficiently high, the discharge capacity of the magnesium battery does not depend on the Mg concentration but the discharge capacity is mainly determined by the discharge capacity of the positive electrode active substance. Accordingly, in the magnesium battery 10 of this example, it can be considered that the electrolyte provides the function with no problem in a case where the Mg concentration is from 0.25 to 1.00 mol/l at which the discharge capacity reaches about 320 (mAh/g).

Example 6

In Example 6, the reaction temperature upon synthesis of the electrolyte was changed in a range from 20 to 90° C. Except for the foregoings, magnesium batteries 10 using the electrolyte according to the embodiment of the present invention were manufactured and the discharge test was conducted on them in the same manner as in Example 1. Table 6 shows the obtained discharge capacity.

Example 7

In Example 7, iodoethane, 1-iodopropane, 2-iodopropane, 1-iodobutane, 2-iodobutane, bromoethane, 1-bromopropane, 2-bromopropane, 1-bromobutane, 2-bromobutane, bromobenzene, o-dibromobenzene, m-dibromobenzene, p-dibromobenzene, 1-chloropropane, 2-chloropropane, chlorobenzene, o-dichlorobenzene, m-dichlorobenzene, and p-dichlorobenzene were used instead of iodomethane as the halogenated hydrocarbon. Except for the foregoings, magnesium batteries 10 using the electrolyte according to the embodiment of the present invention were manufactured and the discharge test was conducted on them in the same manner as in Example 1. The obtained discharge capacity also including that of Example 1 are shown in Table 7.

TABLE 7

| | Halogen X | | |
|---|---|---|---|
| Halogen substitute | Iodine | Bromine | Chlorine |
| CH$_3$X | 298.9 | | |
| CH$_3$CH$_2$X | 300.8 | 296.1 | |
| CH$_3$CH$_2$CH$_2$X | 300.7 | 297.9 | 301.0 |
| CH$_3$CHXCH$_3$ | 299.8 | 298.8 | 299.4 |
| CH$_3$CH$_2$CH$_2$X | 301.8 | 302.2 | |
| CH$_3$CH$_2$CHXCH$_3$ | 302.5 | 301.3 | |
| C$_6$H$_5$X | | 289.6 | 297.8 |
| o-C$_6$H$_4$X$_2$ | | 291.8 | 300.4 |
| m-C$_6$H$_4$X$_2$ | | 291.6 | 300.6 |
| p-C$_6$H$_4$X$_2$ | | 288.6 | 297.6 |

As shown in Table 7, the magnesium ion containing non-aqueous electrolyte according to the embodiment of the

TABLE 6

| Battery | Mg concentration (mol/l) | CH$_3$I concentration (mol/l) | AlCl$_3$ concentration (mol/l) | Quaternary salt concentration (mol/l) | Heating temperature (° C.) | Discharge capacity (mAh/g) |
|---|---|---|---|---|---|---|
| Example 6-1 | 0.50 | 0.50 | 1.00 | 1.00 | 20 | 0.0 |
| Example 6-2 | | | | | 30 | 112.7 |
| Example 6-3 | | | | | 40 | 215.4 |
| Example 6-4 | | | | | 50 | 316.9 |
| Example 4-5 | | | | | 60 | 317.7 |
| Example 6-5 | | | | | 70 | 324.2 |
| Example 6-6 | | | | | 80 | 310.1 |
| Example 6-7 | | | | | 90 | 157.4 |

FIG. 6 is a graph showing a relation between the reaction temperature upon synthesis of the electrolyte in Example 6 and the discharge capacity of the magnesium battery manufactured by using the electrolyte. As shown in Table 6 and FIG. 6, it can be seen that the electrolyte synthesized in Example 6 shows good discharge capacity in a case where the reaction temperature is within a range from 50 to 80° C.

present invention shows substantially identical performance on the discharge capacity also in a case of manufacture by using any of the halogenated hydrocarbons described above.

As shown in Comparative Example 3, while the THF solution of magnesium dichlorobutylethyl aluminate described as the electrolyte for magnesium battery in the Non-Patent Document 1 has to be handled in an inert gas atmosphere in an argon glove box, whereas the magnesium ion containing non-aqueous electrolyte according to the embodiment of the present invention can be handled in a dry room as a usual facility.

Further, as shown in Examples 2 to 6, it is preferred to add metal magnesium at a ratio of 0.25 to 1.00 mol/l to 1,2-dimethoxyethane as the solvent, $CH_3I$ at 0.80 to 1.20 mol, $AlCl_3$ at 1.00 to 2.00 mol, and the quaternary ammonium salt: $CF_3SO_3N(C_4H_9)_4$ at 1.00 to 2.00 mol based on 1 mol of magnesium, and react them at 50 to 80° C. while stirring.

The magnesium ion containing non-aqueous electrolyte and production process thereof of the example are simple and convenient compared with the existent method since the solvent for the electrolyte per se is used for synthesis. Further, since metal magnesium, magnesium salt, and other stable materials are used as the starting material, administration for the starting materials is easy and production can be conducted in a simple facility such as a dry room with a good productivity and in good yield. That is, it is possible to greatly save the production cost upon putting the electrolyte to practical use as the product.

While the invention has been described above with reference to preferred embodiments and examples, the examples described above can be modified variously based on the technical concept of the invention.

For example, in the electrochemical device according to the embodiment of the present invention suitable as a primary or secondary battery, the shape, the constitution, the material, etc. thereof can be selected properly so long as they do not depart from the gist of the present invention.

The electrochemical device according to the embodiment of the present invention provides a magnesium secondary battery having a constitution capable of taking advantage of excellent properties of polyvalent metals such as metal magnesium as the negative electrode active substance, for example, high energy capacity and contributes to miniaturization, reduction in the weight, construction of a portable equipment for a small-sized electronic equipments, as well as contributes to the improvement for the conveniency and decrease in the cost.

It should be understood by those skilled in the art that various modifications, combinations, sub-combinations and alterations may occur depending on design requirements and other factors insofar as they are within the scope of the appended claims or the equivalents thereof.

What is claimed is:

1. A magnesium ion containing non-aqueous electrolyte comprising magnesium and aluminum ions dissolved in an organic etheric solvent, the stoichiometric ratio of the aluminum ions and the magnesium falling within a range of 1.0 to 2.0, the electrolyte formed by:
    adding metal magnesium, a halogenated hydrocarbon RX, an aluminum halide $AlY_3$, and a quaternary ammonium salt $R^1R^2R^3R^4N^+Z$ to the organic etheric solvent to form a mixture, wherein R is an alkyl group or an aryl group, X is chlorine, bromine, or iodine, Y is chlorine, bromine, or iodine, and wherein $R^1$, $R^2$, $R^3$, and $R^4$ represent each an alkyl group or an aryl group, and $Z^-$ represents a chloride ion ($Cl^-$), a bromide ion ($B^-$), an iodide ion ($I^-$), an acetate ion ($CH_3COO^-$), a perchlorate ion ($ClO_4^-$), a tetrafluoro borate ion ($BF_4^-$), a hexafluoro phosphate ion ($PF_6^-$), a hexafluoro arsenate ion ($AsF_6^-$), a perfluoroalkyl sulfonate ion ($Rf1SO_3^-$) (Rf1 is perfluoroalkyl group), or a perfluoroalkyl sulfonylimide ion (($Rf2SO_2)_2N^-$)(Rf2 is a perfluoroalkyl group); and
    applying a heating treatment while stirring the mixture, wherein the electrolyte has a higher oxidation potential than a Grignard reagent formed by a reaction between the metal magnesium and the halogenated hydrocarbon RX.

2. The magnesium ion containing non-aqueous electrolyte according to claim 1, wherein the halogenated hydrocarbon comprises at least one element selected from a group consisting of iodomethane, iodoethane, 1-iodopropane, 2-iodopropane, 1-iodobutane, 2-iodobutane, bromoethane, 1-bromopropane, 2-bromopropane, 1-bromobutane, 2-bromobutane, bromobenzene, o-dibromobenzene, m-dibromobenzene, p-dibromobenzene, 1-chloropropane, 2-chloropropane, chlorobenzene, o-dichlorobenzene, m-dichlorobenzene, and p-dichlorobenzene.

3. The magnesium ion containing non-aqueous electrolyte according to claim 1, wherein the halogenated hydrocarbon is added to the organic etheric solvent at a ratio in a range from 0.8 to 1.2 mol based on 1 mol of the metal magnesium.

4. The magnesium ion containing non-aqueous electrolyte according to claim 1, wherein the aluminum halide is aluminum chloride.

5. The magnesium ion containing non-aqueous electrolyte according to claim 1, wherein the aluminum halide is added to the organic etheric solvent at a ratio in a range from 1.0 to 2.0 mol based on 1 mol of the metal magnesium.

6. The magnesium ion containing non-aqueous electrolyte according to claim 1, wherein the quaternary ammonium salt is tetrabutyl ammonium trifluoromethane sulfonate ($CF_3SO_3N(C_4H_9)_4$).

7. The magnesium ion containing non-aqueous electrolyte according to claim 1, wherein the quaternary ammonium salt is added to the organic etheric solvent at a ratio in a range of 1.0 to 2.0 mol based on 1 mol of the metal magnesium.

8. The magnesium ion containing non-aqueous electrolyte according to claim 1, wherein the organic etheric solvent is 1,2-dimethoxyethane.

9. The magnesium ion containing non-aqueous electrolyte according to claim 1, wherein the metal magnesium is added to the organic etheric solvent at a ratio in a range from 0.25 to 1.0 mol per liter of the organic etheric solvent.

10. The magnesium ion containing non-aqueous electrolyte according to claim 1, wherein a heating temperature during the heating treatment is in a range from 50 to 80° C.

11. An electrochemical device having a first electrode, a second electrode, and a magnesium ion containing non-aqueous electrolyte according to claim 1, wherein an active substance of the second electrode is constituted so as to be oxidized to form magnesium ions.

12. The electrochemical device according to claim 11, wherein the active substance of the second electrode is elemental metal of magnesium or an alloy containing magnesium.

13. The electrochemical device according to claim 11, wherein an active substance of the first electrode comprises a compound reactive with the magnesium ions or a compound occluding the magnesium ions.

14. The electrochemical device according to claim 11, which is constituted as a battery.

15. The electrochemical device according to claim 14, which is constituted as a secondary battery chargeable by reverse reaction.

16. The magnesium ion containing non-aqueous electrolyte according to claim 1, further comprising a hydrocarbon, the stoichiometric ratio of the hydrocarbon and the magnesium falling within a range of 0.8 to 1.2.

17. The magnesium ion containing non-aqueous electrolyte according to claim 1, further comprising an ammonium salt, the stoichiometric ratio of the ammonium salt and the magnesium falling within a range of 1.0 to 2.0.

18. The magnesium ion containing non-aqueous electrolyte according to claim 1, wherein the ratio of magnesium to the organic etheric solvent falls within a range of 0.25 to 1.00 mol/L.

* * * * *